(12) United States Patent
Hildebrand et al.

(10) Patent No.: US 8,558,136 B2
(45) Date of Patent: Oct. 15, 2013

(54) METHOD AND DEVICE FOR THE PRODUCTION OF A SWAGING

(75) Inventors: Peter Hildebrand, Pfronten (DE);
Martin Reisacher, Kempten (DE);
Michael Kuhl, Fussen (DE); Gottfried Reinicke, Kempten (DE)

(73) Assignee: Sauer GmbH, Stipshausen (DE)

( * ) Notice: Subject to any disclaimer, the term of this patent is extended or adjusted under 35 U.S.C. 154(b) by 1560 days.

(21) Appl. No.: 10/558,506

(22) PCT Filed: May 27, 2004

(86) PCT No.: PCT/EP2004/005731
§ 371 (c)(1),
(2), (4) Date: Dec. 6, 2006

(87) PCT Pub. No.: WO2004/105996
PCT Pub. Date: Dec. 9, 2004

(65) Prior Publication Data
US 2007/0181542 A1    Aug. 9, 2007

(30) Foreign Application Priority Data

May 28, 2003    (DE) .................................. 103 24 439

(51) Int. Cl.
*B23K 26/08* (2006.01)
*B23K 26/36* (2006.01)

(52) U.S. Cl.
USPC ............. 219/121.68; 219/121.69; 219/121.61

(58) Field of Classification Search
USPC ............. 219/121.68, 121.69, 121.78, 121.83, 219/121.81
See application file for complete search history.

(56) References Cited

U.S. PATENT DOCUMENTS

| 5,331,131 A | * | 7/1994 | Opdyke | .................... 219/121.69 |
| 5,596,446 A | * | 1/1997 | Plesko | ........................ 359/214.1 |

(Continued)

FOREIGN PATENT DOCUMENTS

| DE | 100 54 853 A1 | 8/2002 |
| DE | 101 62 379 A1 | 7/2003 |

(Continued)

OTHER PUBLICATIONS

European Patent Office, *International Search Report and Written Opinion*, PCT/EP2004/005731, Mailed Sep. 27, 2004 (11 pages).

(Continued)

*Primary Examiner* — Samuel M Heinrich
(74) *Attorney, Agent, or Firm* — Wood, Herron & Evans, LLP

(57) ABSTRACT

The invention relates to a method for producing a swaging in a workpiece, wherein a laser beam is guided through a beam guide over the surface of the workpiece in order to produce said swaging. The focal position of the laser beam is controlled in such a way that it can be varied at least temporarily in depth direction of the swaging. A device for the production of a swaging (6) in a workpiece (5) has a laser light source (1) for producing a laser beam for removing material, a focus adjustment device (3) for adjusting the focal position of the laser beam, a beam guide (4) for guiding the laser beam (20) over the surface of the workpiece and a control device (7) for controlling the focus adjustment device (3) and the beam guide (4). The control device is designed to control the focal position of the laser beam by means of the focus adjustment device (3) at least temporarily to variable values in depth direction of the swaging.

40 Claims, 4 Drawing Sheets

(56) References Cited

U.S. PATENT DOCUMENTS

| | | | |
|---|---|---|---|
| 5,880,430 A * | 3/1999 | Wein | 219/121.69 |
| 5,898,523 A * | 4/1999 | Smith et al. | 359/530 |
| 6,043,452 A * | 3/2000 | Bestenlehrer | 219/121.62 |
| 6,087,618 A * | 7/2000 | Wiener-Avnear et al. | 219/121.6 |
| 6,120,725 A * | 9/2000 | Asahi et al. | 264/400 |
| 6,333,485 B1 * | 12/2001 | Haight et al. | 219/121.68 |
| 6,407,844 B1 * | 6/2002 | Yang et al. | 359/224.1 |
| 6,423,933 B2 * | 7/2002 | Nicholas et al. | 219/121.7 |
| 6,552,301 B2 * | 4/2003 | Herman et al. | 219/121.71 |
| 6,670,575 B1 * | 12/2003 | Wrba et al. | 219/121.68 |
| 6,787,734 B2 * | 9/2004 | Liu | 219/121.7 |
| 7,893,384 B2 * | 2/2011 | Lin | 219/121.68 |
| 2001/0045419 A1 * | 11/2001 | Dunsky et al. | 219/121.76 |
| 2004/0102764 A1 * | 5/2004 | Balling | 606/5 |

FOREIGN PATENT DOCUMENTS

| | | |
|---|---|---|
| WO | WO 00/18535 | 4/2000 |
| WO | WO 00/19167 | 4/2000 |

OTHER PUBLICATIONS

Cummings et al., *Method of Ablating an Opening in a Hard, Non-Metallic Substrate*, United States Patent Application Publication No. US 2003/0006220 A1, Published Jan. 9, 2003.

* cited by examiner

METHOD AND DEVICE FOR THE PRODUCTION OF A SWAGING

FIELD OF THE INVENTION

The invention relates to a method and a device for the production of a swaging.

BACKGROUND TO THE INVENTION

Filigree swagings may be produced by means of laser beams. FIG. 1 shows a known device for this process. 1 denotes a laser light source, 2 denotes a switch (optical or electric), 3 denotes a focus control, 4 denotes a beam guide, 5 denotes a workpiece, 6 denotes a swaging, 7 denotes a control device, 8 denotes a sensor (depth sensor, location-sensing), 9 denotes a workpiece table, 10 denotes a laser beam, and 11 denotes the z axis adjustment of the worktable. The plane of projection is considered as the x-z plane, as schematically shown. The y axis is perpendicular to the plane of projection.

A laser beam 10 is generated in the laser 1. 2 symbolizes an ON/OFF tracer which may be designed as a q-switch, as well as an intensity control device. Traced and, if necessary, level controlled laser light then reaches the focus control 3 which is able to adjust the focal position in the z direction. After that, the laser light passes through a beam guide 4 which may consist e.g. of mirrors positioned at right angles to each other. The mirrors are capable of rotating within specified angle ranges and thus can effect that the point of impingement of the laser beam 10 on the workpiece 6 is controlled in the x-y plane.

The material is ablated by liquefaction and vaporization, respectively, of the material on the surface of the workpiece. For this purpose, the focus of the laser beam is positioned on the surface of the workpiece so that there will be a high area performance input such that the material melts and vaporizes and is thus removed. The laser beam is guided area-wise over the exposed surface in accordance with swaging data for the swaging to be produced. 6 indicates the already produced (partial) swaging, 6a symbolizes the outer surface of the desired finished swaging. The ablation is carried out in layers. When one layer has been ablated, the workpiece table 9 is lifted together with the workpiece 5 by a height corresponding to one layer so that the next layer may now be ablated.

The focus adjustment device 3 is used to compensate the non-planar spherical cap, which as a rule is ball-shaped and on which the focus of the laser beam moves in case of a deflection in the x and y directions. This will be explained in more detail with reference to FIG. 3.

The control device 7 controls the individual components (laser 1, switch and intensity control device 2, focus adjustment device 3, beam guide 4, z axis 11). It obtains the data to be introduced by referring to swaging data 12, which may e.g. be CAD data, and to other parameters as well, if necessary.

FIG. 2 shows the focus adjustment device 3 in more detail. Coming from the laser 1 and the switch 2, respectively, the laser beam 10 at first passes through a diverging lens 21 and then one or more converging lenses 22, 23. The diverging lens 21 can be repositioned in the z direction by an adjustment device 24. Different courses of ray result therefrom and lead to the fact that corresponding to a repositioning of the diverging lens 21 the focal position will in the end also be repositioned in the z direction. Two courses of ray are schematically indicated, i.e. one by solid lines and another by dashed lines. The positions of the lenses are denoted by P1 and P2, respectively. Along with the different positions P1 and P2, different focal positions f1 and f2 are generated. They are denoted by 20-1 and 20-2 and differ from each other by $\Delta z$. The possible maximum of $\Delta z$ is referred to as a stroke.

FIG. 3 shows a usual method for the production of a swaging and the usual application of the focus adjustment device. In FIG. 3 and generally in this description same components are denoted by the same reference numerals. 6 symbolizes the swaging already finished in part. 31a, b and c symbolize the layers to be ablated one after the other. In the embodiment as shown the laser beam 10 is guided over the area in the direction of the arrow 30 along a specified path. The material melts and evaporates, respectively, at the point of impingement and is thus removed. 32 denotes the outer surface of the swaging part to be produced in the following. 33 denotes the surface which has already been exposed. As the laser is guided in the x and y directions by means of rotatable mirrors, its focal point 20 does not move on a plane in space but on a generally ball-shaped, arched spherical cap 34. This could easily lead to the laser beam and its focus 20 being within the layer to be ablated at best only in some parts thereof when it is guided over the area. In other areas an intrafocal or an extrafocal portion of the laser beam would impinge on the surface of the material, with the result that the energy density would not be sufficiently high, the material would not evaporate or only to a minor degree and consequently the ablation performance would decrease or become very uneven.

In order to compensate for this effect, the focus adjustment device is used in known ablation methods and ablation devices, respectively. In the end, it corrects the focal position difference between the easily adjusting spherical cap 34 and the desired position in the plane as symbolized by the straight line 35. Thus, the focus adjustment device changes the focal position in the z direction depending on the respective momentary x and y position of the laser beam in order to adjust the focus to the plane 35 in correspondence to the momentarily ablated layer 31a.

When a layer has been completely ablated the z axis mechanically follows by the height of one layer. In FIG. 1 this may e.g. be carried out by lifting the workpiece table 9 by means of a position member 11. Through this adjustment the next layer (31b) is ablated similarly. The disadvantage of this method is that the mechanical guiding of the swaging in the z direction is time-consuming. This shows particularly in the case of small swagings wherein the adjustment time in the z direction is comparatively long in comparison to the machining time for ablating a layer.

FIG. 3 shows another disadvantage of the known ablation in layers: 32 symbolizes the desired (theoretical) outer surface of the swaging to be produced last. However, due to the ablation in layers, the result is in fact a nonideal but real course, as shown at 33: Due to the ablation in layers the wall proceeds in steps, with the height of the steps corresponding to the thickness of the layer. Depending on the desired quality of the outer surface of the swaging this may be perceived as a bigger or smaller disadvantage.

It is the object of the invention to provide a method and a device for the formation of a swaging which allow the fast production of small swagings as well and the formation of smooth outer surfaces of swagings.

This object is achieved by means of the features of the independent claims. Dependent claims are directed to preferred embodiments of the invention.

SUMMARY OF THE INVENTION

In a method for the production of a swaging in a workpiece a laser beam is guided through a beam guide over the surface of the workpiece to produce a swaging. The focal position of the laser beam is controlled in such a way that it can be varied at least temporarily in depth direction of the swaging.

In a method according to the invention it is possible to follow the individual layers in the z direction by guiding the focal position through the focus adjustment device instead of a mechanical guide. Consequently, the focal position of the laser beam in depth direction of the swaging is guided to variable values at the transition from one layer to the next.

However, the variable adjustment of the focal position of the laser beam may also be effected during the ablation within a layer such that in the end no planar layers are ablated but layers which are non-planar in a determined or desired way.

The focal positions can adjusted out such that the focus in the y direction with respect to the momentarily ablated layer has a defined position, for example it is positioned in the layer or is offset against it in a defined manner.

A device for producing a swaging comprises a laser light source, a focus adjustment device, a beam guide and a control device for the components as mentioned. The control device is designed to control the focal position at least temporarily to variable values in depth direction of the swaging.

BRIEF DESCRIPTION OF THE DRAWINGS

A number of embodiments are described below with reference to the drawings, wherein.

DESCRIPTION OF THE PREFERRED EMBODIMENT

Figure 2:
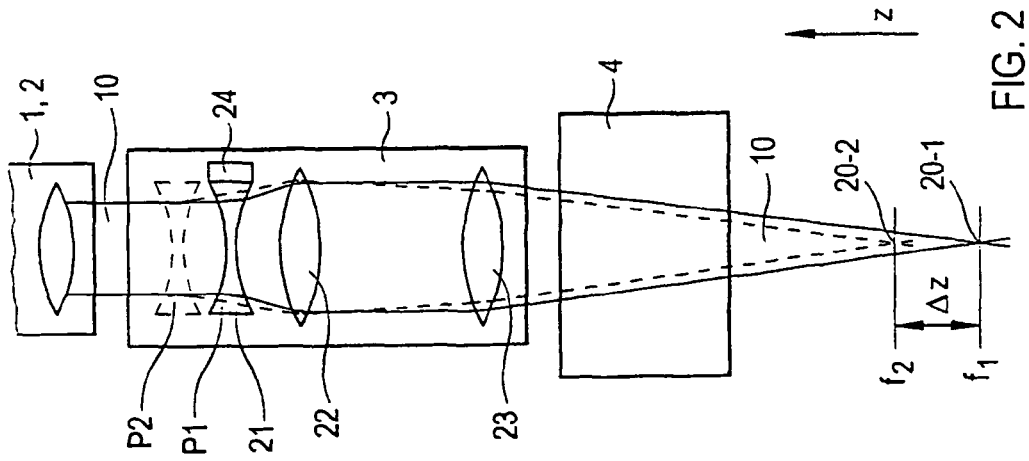
FIG. 2 shows the course of ray, particularly in a focus adjustment device.
Figure 1:
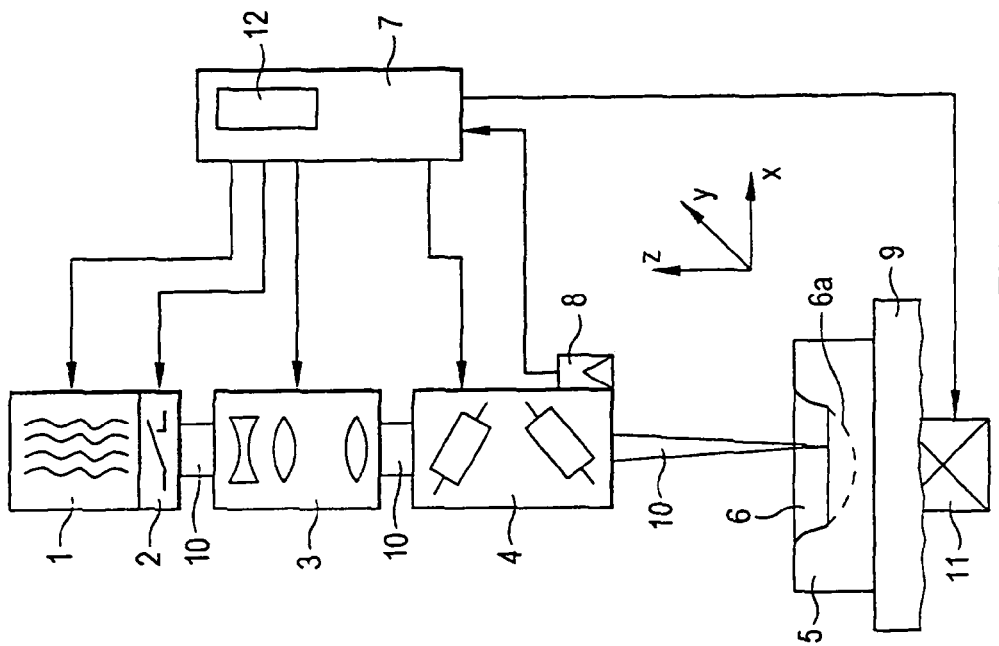
FIG. 1 schematically shows the structure of a device for the production of a swaging.
Figure 3:
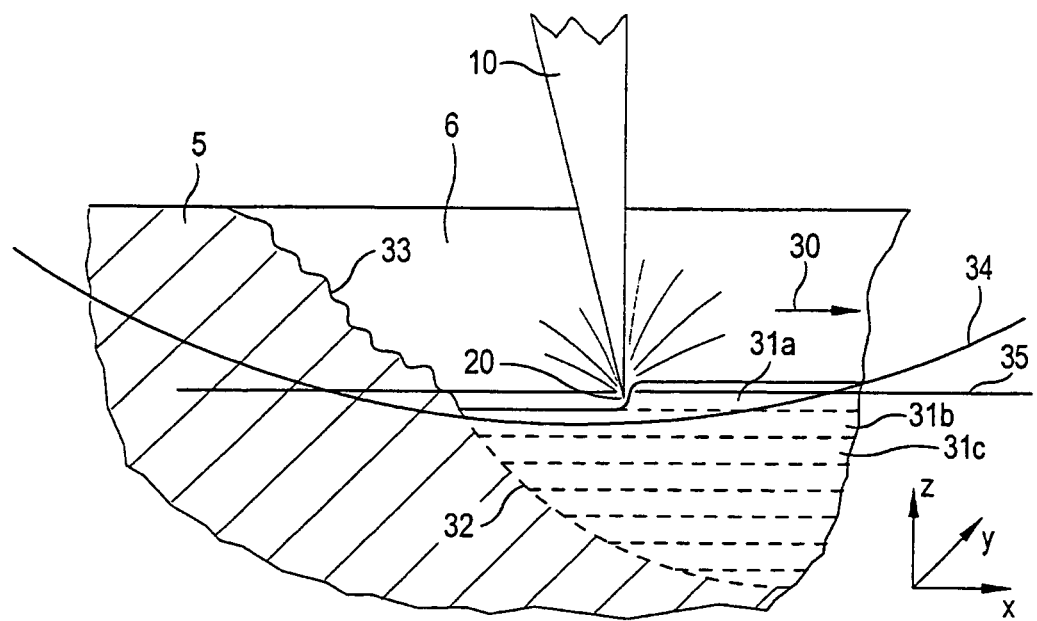
FIG. 3 shows a known method.
Figure 4:
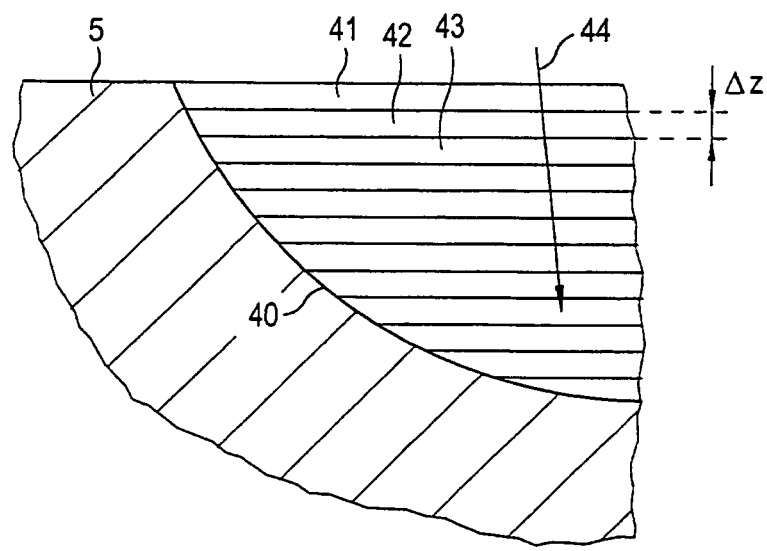
FIG. 4 shows a drawing to illustrate a first method according to the invention.

The method according to the invention can be respectively realized by suitably designing the control device 7 in FIG. 1 or suitably controlling the focus adjustment device 3 in FIGS. 1 and 2. FIG. 4 schematically shows a "layer map" for a swaging to be produced. 40 symbolizes the outer surface of the swaging desired to be the last one. 41 refers to one of the layers to be ablated and further layers 42, 43, . . . follow below that. This means that in the end the work is carried out in the direction of the arrow 44 by ablating in layers. After the ablation of a layer a following layer may be approached by changing the focal position through the focus adjustment device 3 (triggered by the control device 7). This means that after a layer has been ablated the focus as a whole is relocated downward by $\Delta z$ in FIG. 4 by suitably controlling the focus adjustment device 3, and then the following layer will be ablated. During this ablation the focal position compensation can be compensated again in the z direction in a known manner, as described with reference to FIG. 3. The focal position can be guided to the individual layers 41, 42, 43, . . . as often as allowed by the available stroke of the focus adjustment device 3. A specific portion of the stroke may possibly be needed to compensate the focal position, as described in FIG. 3. The additionally available portion of the stroke may be used to control the individual layers. When the maximum possible stroke has altogether been attained, a mechanic guiding may be carried out along the z axis after several layers (position member 11 in FIG. 1). Then several guidings to several layers may be carried out again through a focal position adjustment by $\Delta z$.

Thus, mechanical guiding and one or more guidings through focal position adjustments may be alternatively performed in total. If the available stroke of the focus adjustment device 3 permits, 20 layers may for example be approached one by other by guiding the focal position correspondingly. Next, mechanical guiding by the thickness of 21 layers is performed along the z direction and a plurality of layers, e.g. 20, can be approached again through focal position adjustment.

As the focal position adjustment is considerably faster than the mechanical guiding along the z axis (with the initiation of the necessary control steps and subsequently the repeated switch-over towards the ablation control being the essential value of the latter instead of the repositioning time), it is possible to save time altogether.

Figure 5:
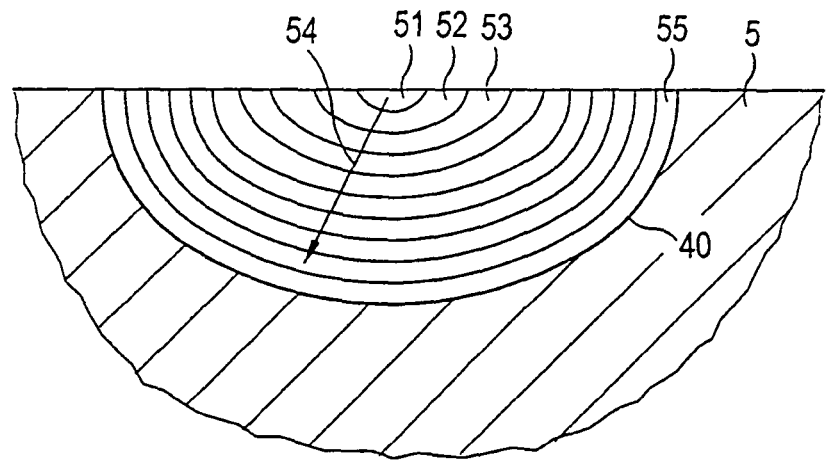
FIG. 5 shows a drawing to illustrate another method according to the invention.

FIG. 5 shows another approach according to the invention. The ablation is no longer performed in planar layers but in non-planar layers 51, 52, 53 . . . . The work is carried out from one layer to the next along the direction of the arrow 54. As shown, the layers may be formed by following the outer surface 40 of the swaging to be produced last or similarly, for example, by having a predetermined distance (by being "parallel to the outer surface") which changes from layer to layer but remains constant within a layer, i.e. which becomes thinner from one layer to the next when approaching the outer surface 40. These individual layers are calculated from the swaging data 12 in the control device 7 and then are inserted by the beam guide 4 on the one hand and by the continuous focus control 3 on the other. The beam guide 4 effects the control of the laser beam in the x and y directions while the focus adjustment device 3 controls the focal position in the z direction such that with respect to the layer that has just been ablated it has a defined position, e.g. is located inside thereof.

In this connection it should be noted that the change of the focal position in the z direction may also influence the x and y coordinates of the impingement point of the focus, i.e. when the laser beam does not impinge on the surface of the swaging in parallel to the z axis. This is appropriately taken into consideration by the control device and the determination of the control data, respectively.

Theoretically, the focal position adjustment may be imagined as consisting of two superimposed components, i.e., the control device in accordance with the desired shape of the layer to be ablated on the one hand and the control device for the compensation of the spherical cap on the other hand, as described with reference to FIG. 3. In terms of figures, these components may be obtained separately or as a unit.

The individual layers, as compared to each other, may have constant or different thicknesses. Particularly, layers near the outer surface may be thinner than layers remote from the outer surface. A single layer may have a constant thickness as well, but not necessarily so.

Figure 6:
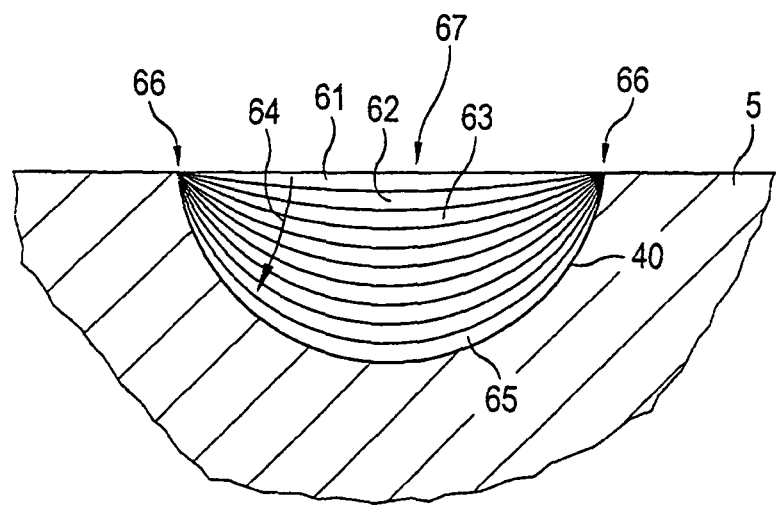
FIG. 6 shows a drawing to illustrate another method according to the invention.

FIG. 6 shows an embodiment wherein an ablation in layers is performed such that finally (at the outer surface 40) layers 65 are produced again which are "parallel to the outer surface". Generally, these are layers 61, 62, 63 which are ablated one by one along the direction of the arrow 64 and each of which comprise layer thicknesses variable in themselves, especially in the form that the layer thickness at the edges 66 of the swaging is smaller than in the center 67 of the swaging.

Figure 7:
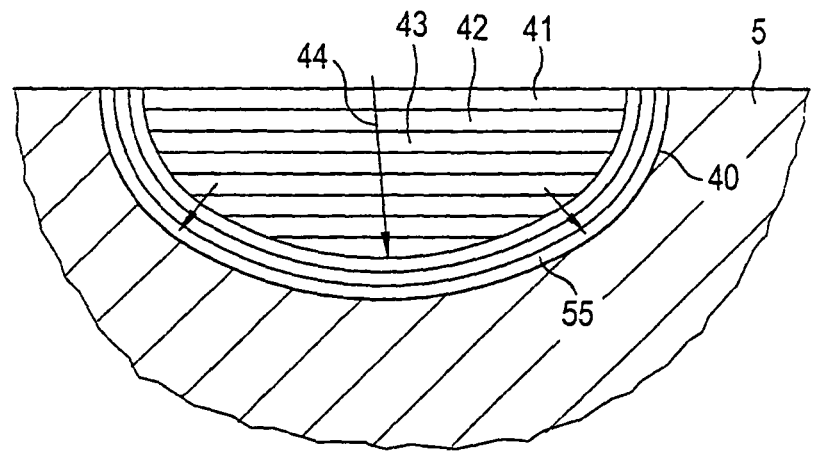
FIG. 7 shows a drawing to illustrate another method according to the invention.

FIG. 7 shows an embodiment wherein different ablation methods are introduced as a mixture. When the swaging of the outer surface 40 of the swaging to be produced last approaches, the material may be ablated to produce the swaging with layers 55 parallel to the outer surface in order to obtain a smooth outer surface 40 in this way. Such outer surface will not show the grading indicated by reference numeral 33 in FIG. 3. However, before that a faster, cruder ablation method may be chosen, for example as described with reference to FIG. 4 or FIG. 6. Finally, FIG. 7 shows a mixed form of FIG. 4 and FIG. 6. At first, the work is performed according to the method in FIG. 4. Here, relatively thick layers (e. g. 3-20 μm) may be ablated with the ablation being made in the individual layers not down to the respective, actually accessible outer surface of the finished swaging, but stopping before ("further inside" the swaging). This is symbolized by the individual layers 41, 42, 43 along the direction of the arrow 44 (direction of work). This approach may be interrupted inside of each layer and generally, respectively, at a specific distance to the outer surface 40 of the finished swaging, and then transition can be made to the machining in parallel to the outer surface, as described above, with relatively thin layers (1-3 μm).

In this way the advantage of a fast ablation in crude layers is combined with that of the accurate production of the outer surface by layers in parallel to the outer surface at the end of the production of the swaging, which may be relatively thin at least on the outermost side. Instead of planar, parallel layers in FIG. 4 or in the first section of FIG. 7 as well, layers may be introduced which are located on the focus spherical cap of the focal control. Then the continuous focal control and the corresponding calculation and control efforts will no longer be necessary.

Figure 8:
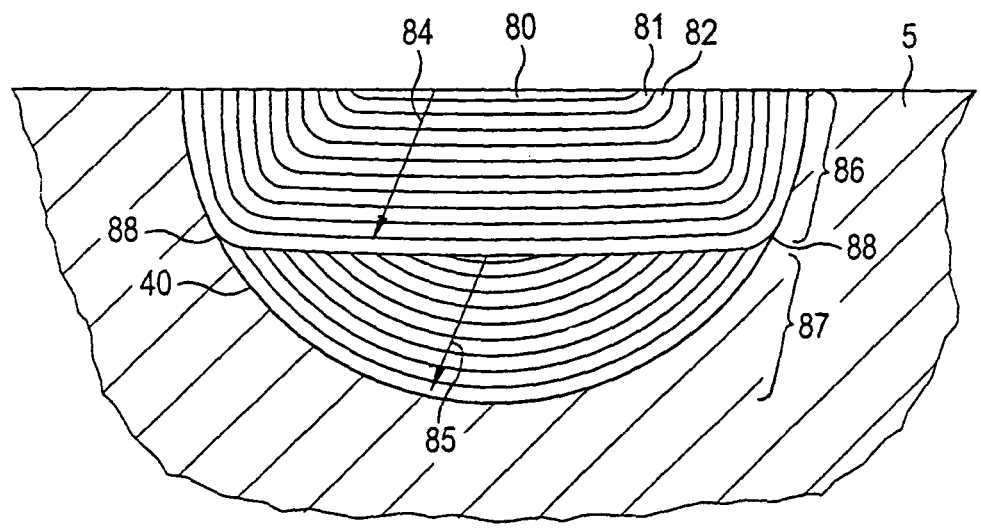
FIG. 8 shows a drawing to illustrate another method according to the invention.

FIG. 8 shows an embodiment wherein several or all layers to be ablated are also determined in accordance with the available stroke of the focus adjustment. It may happen in deep swagings that the available stroke of the focus adjustment does not suffice to completely cover the outer surface 40 of the swaging in the z direction. The swaging will then be logically divided into single sections 86, 87 and accordingly into production sections 84, 85 which may be regarded as partial swagings in themselves and may each be fully approached in themselves within the available stroke of the focus control. The work may respectively be resumed within the corresponding segments 86, 87, as described with reference to FIGS. 5 to 7. FIG. 8 shows an embodiment wherein the individual "partial swagings" 86, 87 are each machined as described in FIG. 5. The partial swagings are defined such that they may be respectively produced within a stroke of the focus adjustment device 3, wherein it is possible to optionally take into consideration the part of the hub required for the compensation of the spherical cap, particularly so that it is not available for the production of the swaging in depth direction. This approach is advantageous in that discontinuities on the outer surface 40 can occur only at the "seams" 88 of the partial swagings, because for the rest the work may be carried out again in parallel to the outer surface. Instead of machining the partial swagings 86 and 87 corresponding to FIG. 5, these partial swagings may also be machined according to FIG. 6 or FIG. 7.

Preferably, the depth sensor 8 is a location-sensing depth sensor. It is capable of obtaining the respective depth and dimension in the z direction for individual x-y positions. Preferably, this is performed in real time, for example by suitably evaluating the process radiation at the respective momentary point of machining of the laser beam. Thus a "map" is created which indicates the respective depth of the swaging depending on the respective x and y coordinates. It is possible to also adjust the focal control by referring to these measurement data as well.

Generally, the thickness of the momentary ablation may be controlled by controlling the laser power or the laser parameters (power, tracing, guiding speed, . . . ) in general. This control of the ablation performance may location-variable, in particular depending on the momentary x and y coordinates.

The invention claimed is:

1. A method for producing a swaging in a workpiece, wherein a laser beam is guided through a beam guide over a surface of the workpiece in order to produce said swaging,
and further wherein the production of said swaging is carried out by ablation in non-planar layers defined by non-planar boundaries for each non-planar layer and a focal position of the laser beam is controlled in such a way that it is varied at least temporarily in depth direction of the swaging and has a defined position with respect to a momentarily ablated layer.

2. The method according to claim 1, wherein a transition from one layer to a following layer is made by controlling the focal position of the laser beam.

3. The method according to claim 1, wherein the ablation is at least partially carried out in layers which follow or are similar to an outer surface of the finished swaging or which are parallel to said outer surface.

4. The method according to claim 1, wherein the production of the swaging is carried out in a first step by ablating layers which do not reach an outer surface of the finished swaging, and in a second step by ablating non-planar layers which are similar to or follow the outer surface of the finished swaging or which are parallel to said outer surface.

5. The method according to claim 1, wherein the ablation is carried out in layers having a non-constant thickness.

6. The method according to claim 5, wherein the thickness of a layer at its edge is less than in the center.

7. The method according to claim 1, wherein individual layers are obtained in accordance with an available stroke of the focus adjustment.

8. The method according to claim 7, wherein layers are obtained such that they can be controlled within the stroke of the focal adjustment.

9. The method according to claim 1, wherein the focal position of the laser beam is controlled in depth direction of the swaging in accordance to a desired ablation performance.

10. The method according to claim 1, wherein layers are at least partially obtained and ablated so that they lie on a spherical cap on which the focus of the laser beam moves as the laser beam is guided by the beam guide.

11. The method according to claim 3, wherein the production of the swaging is carried out in a first step by ablating layers which do not reach an outer surface of the finished swaging, and in a second step by ablating non-planar layers which are similar to or follow the outer surface of the finished swaging or which are parallel to said outer surface.

12. The method according to claim 3, wherein the ablation is carried out in layers having a non-constant thickness.

13. The method according to claim 4, wherein the ablation is carried out in layers having a non-constant thickness.

14. The method according to claim 1, wherein the thickness of a layer at its edge is less than in the center.

15. The method according to claim 3, wherein a thickness of a layer at its edge is less than in the center.

16. The method according to claim 4, wherein a thickness of a layer at its edge is less than in the center.

17. The method according to claim 3, wherein the individual layers are also obtained in accordance with an available stroke of the focus adjustment.

18. The method according to claim 4, wherein the individual layers are also obtained in accordance with an available stroke of the focus adjustment.

19. The method according to claim 5, wherein the individual layers are also obtained in accordance with an available stroke of the focus adjustment.

20. The method according to claim 6, wherein the individual layers are also obtained in accordance with an available stroke of the focus adjustment.

21. The method according to claim 1, wherein layers are obtained such that they can be controlled within a stroke of the focal adjustment.

22. The method according to claim 3, wherein layers are obtained such that they can be controlled within a stroke of the focal adjustment.

23. The method according to claim 4, wherein layers are obtained such that they can be controlled within a stroke of the focal adjustment.

24. The method according to claim 5, wherein layers are obtained such that they can be controlled within a stroke of the focal adjustment.

25. The method according to claim 6, wherein layers are obtained such that they can be controlled within a stroke of the focal adjustment.

26. The method according to claim 3, wherein the focal position of the laser beam is controlled in depth direction of the swaging in accordance to a desired ablation performance.

27. The method according to claim 4, wherein the focal position of the laser beam is controlled in depth direction of the swaging in accordance to a desired ablation performance.

28. The method according to claim 5, wherein the focal position of the laser beam is controlled in depth direction of the swaging in accordance to a desired ablation performance.

29. The method according to claim 6, wherein the focal position of the laser beam is controlled in depth direction of the swaging in accordance to a desired ablation performance.

30. The method according to claim 7, wherein the focal position of the laser beam is controlled in depth direction of the swaging in accordance to a desired ablation performance.

31. The method according to claim 8, wherein the focal position of the laser beam is controlled in depth direction of the swaging in accordance to a desired ablation performance.

32. The method according to claim 1, wherein layers are at least partially obtained and ablated so that they lie on a spherical cap on which the focus of the laser beam moves as the laser beam is guided by the beam guide.

33. The method according to claim 4, wherein layers are at least partially obtained and ablated so that they lie on a spherical cap on which the focus of the laser beam moves as the laser beam is guided by the beam guide.

34. The method according to claim 5, wherein layers are at least partially obtained and ablated so that they lie on a spherical cap on which the focus of the laser beam moves as the laser beam is guided by the beam guide.

35. The method according to claim 6, wherein layers are at least partially obtained and ablated so that they lie on a spherical cap on which the focus of the laser beam moves as the laser beam is guided by the beam guide.

36. The method according to claim 7, wherein layers are at least partially obtained and ablated so that they lie on a spherical cap on which the focus of the laser beam moves as the laser beam is guided by the beam guide.

37. The method according to claim 8, wherein layers are at least partially obtained and ablated so that they lie on a spherical cap on which the focus of the laser beam moves as the laser beam is guided by the beam guide.

38. The method according to claim 9, wherein layers are at least partially obtained and ablated so that they lie on a spherical cap on which the focus of the laser beam moves as the laser beam is guided by the beam guide.

39. A device for the production of a swaging in a workpiece, comprising:
   a laser light source for producing a laser beam for removing material,
   a focus adjustment device for adjusting the focal position of the laser beam,
   a beam guide for guiding the laser beam over a surface of the workpiece, and
   a control device for controlling the focus adjustment device and the beam guide,
   wherein the control device is configured to guide the laser beam over the surface of the workpiece by means of the beam guide and control the focal position of the laser beam by means of the focus adjustment device at least temporarily to variable values in depth direction of the swaging for the production of the swaging by ablation in non-planar layers defined by non-planar boundaries for each non-planar layer.

40. The device according to claim 39, further comprising a sensor for measuring a depth in the swaging, with said control device being configured to control an ablation performance of the laser beam in accordance with an output of said sensor.

* * * * *